Jan. 13, 1953     E. E. FOSTER     2,625,425
COMBINED AIR CONDITIONER AND VISOR FOR VEHICLES
Filed Aug. 2, 1948     3 Sheets-Sheet 1
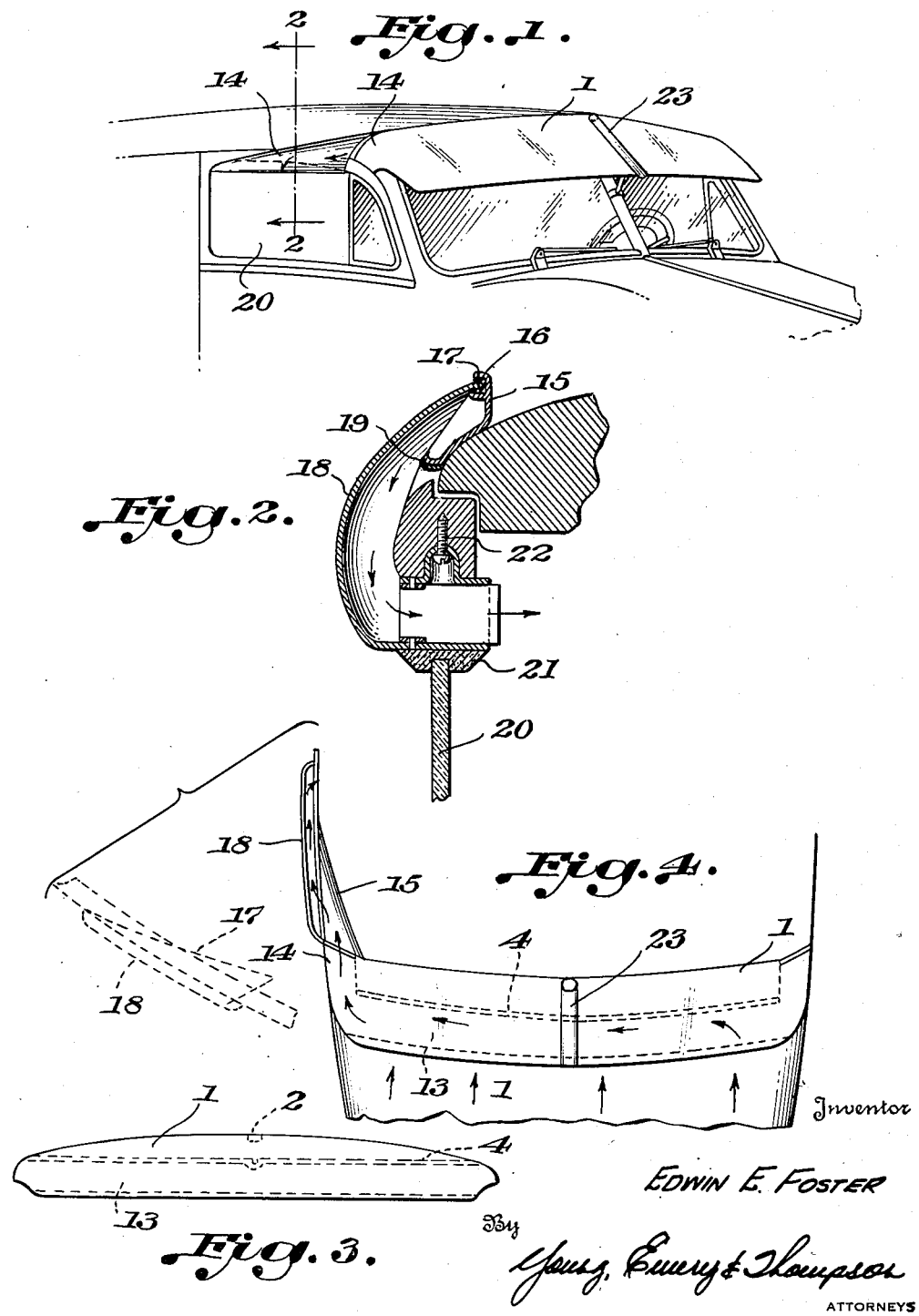
Inventor
EDWIN E. FOSTER
By Young, Emery & Thompson
ATTORNEYS Jan. 13, 1953  E. E. FOSTER  2,625,425
COMBINED AIR CONDITIONER AND VISOR FOR VEHICLES
Filed Aug. 2, 1948  3 Sheets-Sheet 2
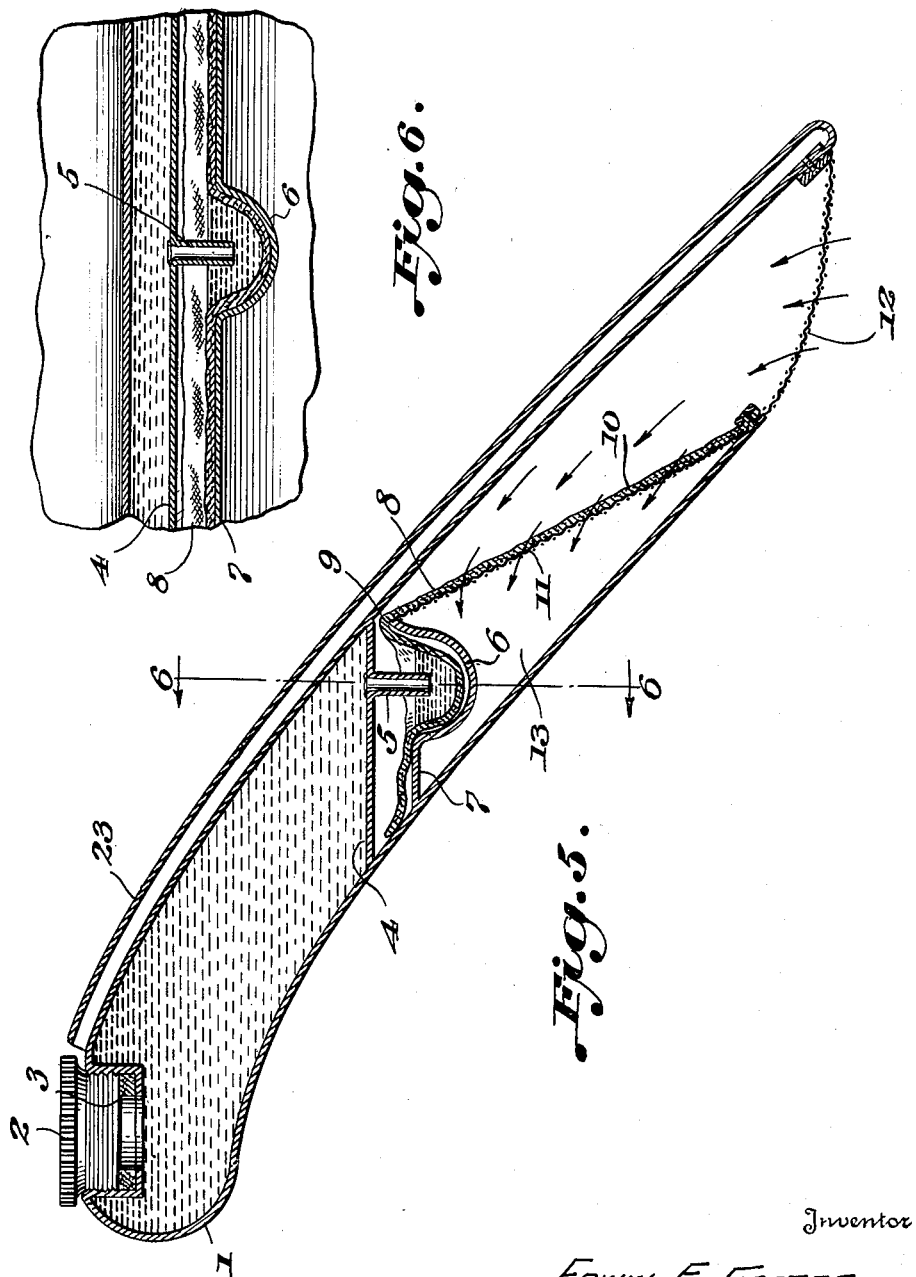

Jan. 13, 1953 E. E. FOSTER 2,625,425
COMBINED AIR CONDITIONER AND VISOR FOR VEHICLES
Filed Aug. 2, 1948 3 Sheets-Sheet 3
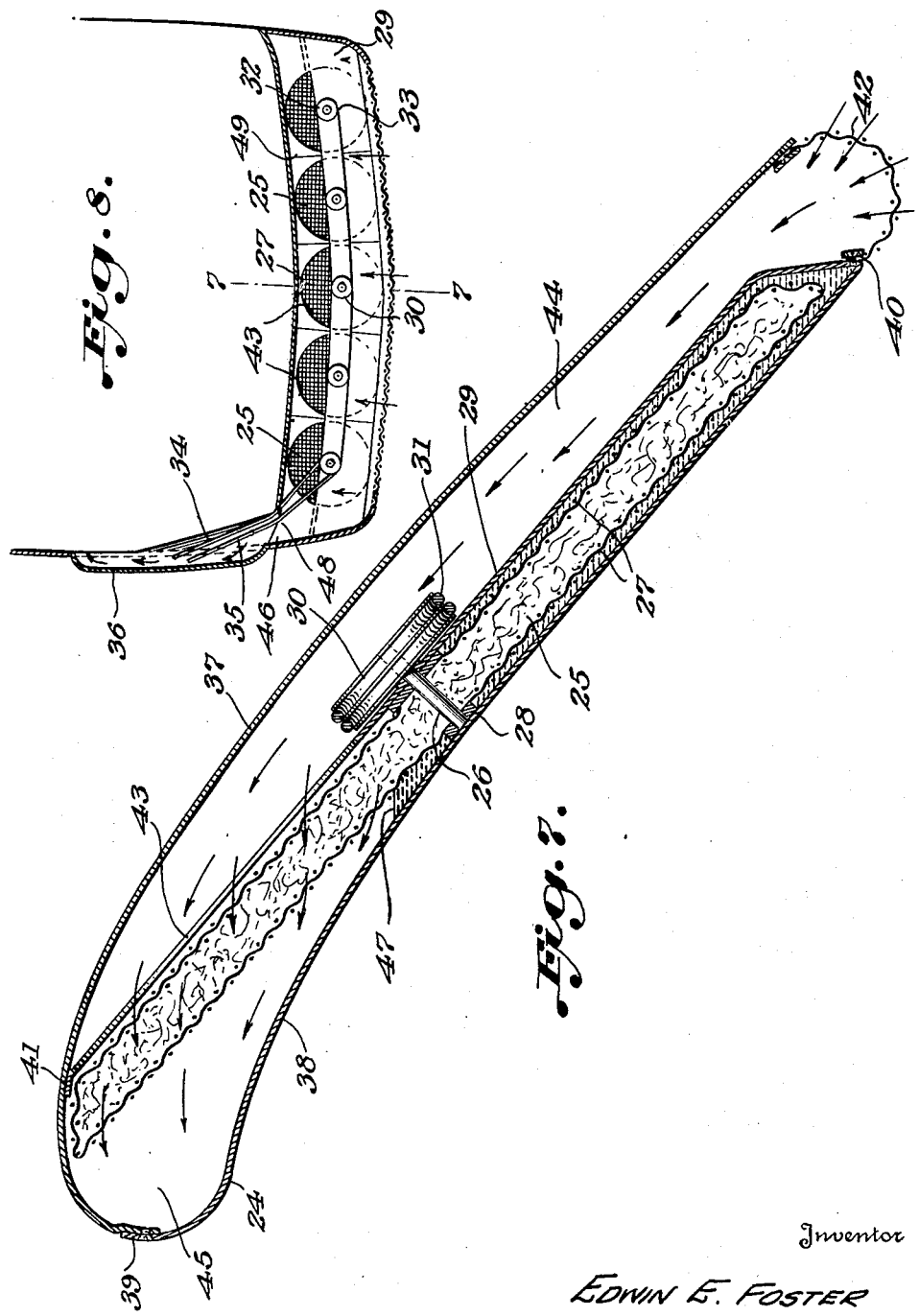
Inventor
EDWIN E. FOSTER
By
Young, Emery & Thompson
ATTORNEYS Patented Jan. 13, 1953

2,625,425

UNITED STATES PATENT OFFICE 2,625,425

COMBINED AIR CONDITIONER AND VISOR FOR VEHICLES

Edwin E. Foster, Austin, Tex.

Application August 2, 1948, Serial No. 42,106

11 Claims. (Cl. 296—95)

This invention relates to a combination cooling device and visor which is particularly adapted to be attached to an automobile above the windshield thereof which has the double purpose of shielding the occupants of the car from sun and other glare and to operate as a cooling device for the inside space of the vehicle.

It is therefore an object of the invention to provide an automobile with a visor which is built as a hollow shell in which means are provided to receive air and cool it and direct such cooled air into the inside of the automobile. A further object resides in a structure which may be intermittently operated to maintain a wet surface or mat to the passage of the air to cool the latter. A still further object of the invention resides in means to guide and direct the cooled air from the visor to the side of the automobile and into the inside thereof above one of the door windows.

Further objects will be apparent from the following description when considered in connection with the accompanying drawings in which:

Figure 1 is a perspective view of the combination visor and cooler as applied and secured to a vehicle, Fig. 2 is a sectional view of a detail of the air inlet duct taken on line 2—2 of Fig. 1, Fig. 3 is a front view of the combination visor and cooler, Fig. 4 is a top plan view of the combination visor and cooler attached to the vehicle, Fig. 5 is a cross section through the combined visor and cooler taken on line 5—5 of Fig. 4, Fig. 6 is a fragmentary sectional view taken on line 6—6 of Fig. 5 in the direction of the arrows, Fig. 7 is a cross section through the combined visor and cooler showing a modified structure and taken on line 7—7 of Fig. 8, and Fig. 8 is a top plan view partly in section showing the modified structure of Fig. 7.

The form of the invention shown in Figs. 1 to 6 shows a visor or casing in which the top part or section 1 forming a water reservoir and having a filler cap 2 which is provided with a rubber or similar ring seal 3 to form a tight closure. The bottom 4, Fig. 5, is provided with a small outlet tube 5 extending into a cup-shaped depression 6 formed in a partition or trough 7 acting as a holder for a wick material 8. This wick soaks water out of the trough 7 and carries it up over the upper edge 9 of the trough 7, Fig. 5, and then down the entire sheet or wick 10 of fabric through which air to be cooled is forced. The entire surface of the wick 10 is preferably supported by means of a rust proof screen 11 which is preferably a continuation of the air inlet screen 12 at the lower edge of the visor. This screen 11 projects over the edge 9 of the trough and into the latter. It has been found by experiment that a good wick material when stretched over the entire length of the visor and into the trough 7 will stay thoroughly wet even though the water level is confined to the cup 6. The trough part is used mostly to take care of any splashover that might occur while turning corners and driving over rough roads.

The level of the water in the cup 6 is maintained due to the fact that the filler cap 2 forms an air seal and air can only enter the reservoir 1 through the tube 5. As soon as enough water has been absorbed to lower the level to the bottom of the tube 5 air which has entered the trough at the point 9 will enter the reservoir which will allow water to drain into the cup 6 until it fills the bottom of the tube 5 with water. When air enters the lower end of the visor through the screen 12 due to the motion of the car, the air follows the path of the arrows and is forced through the porous wick material 10. The air thus cooled by evaporation of moisture in the wick, now flows or is forced along and through a channel 13 laterally along the visor to the end 14 thereof, Fig. 4. At this corner or end 14 of the visor, an adapter plate 15, Figs. 2 and 4, is provided which has a rubber seal 16 which cooperates with an edge 17 of an air channel housing 18, Fig. 2. This adapter plate 15 preferably fits into the usual drain trough 19 commonly used on automobiles. Thus the adapter plate 15 fits into the drain trough 19 and together with the housing 18 forms a rather air tight channel for the passage of air currents from the end corner 14 of the visor into the car as shown in Figs. 2 and 4.

Referring to Fig. 5 when air has been forced to enter the front end or edge of the visor through the screen 12, due to the forward motion of the car and is forced through the porous wick 10, it is then forced through the channel 13 to the end 14 of the visor, Fig. 1, adjacent to the front door of the car.

As best seen in Fig. 2, the window glass 20 is rolled up against a rubber sealing strip 21 secured on the underside of the housing 18. If desired the window glass 20 may be lowered since the housing 18 is fixed to the upper part of the door by means of screws 22. When the door is open as shown in the dotted line position in Fig. 4, the housing 18 separates from the adapter plate 15, but when the door is closed the air channel is re-formed. In Fig. 5 a chromium strip 23 may be provided which is for decorative purposes but also acts to partly conceal the filler cap 2.

Referring now to the modification illustrated in Figs. 7 and 8, the visor casing 24 is provided with a plurality of disc pads 25, each of which is mounted on or pivoted on a pin or axle 26 and each pad includes a wire screen 27 on the front and back thereof. Each pin 26 is fixed in or rotates in a bearing block 28 and extends through a hole in a reservoir plate or partition 29. A pulley or drum 30 is secured on each pin 26 and an endless cable 31 extends around each pulley 30 and is anchored or secured to the end pulley 32 at the point 33, Fig. 8. The cable 31 may thus be continuous or each pair of adjacent pulleys may be connected by a separate cable or cord. Two lead off cables 34 and 35 are connected to the left end pulley, Fig. 8, and extend into the inside of the car so that when one of the cords is pulled all of the pulleys are rotated, preferably a one-half turn. Thus when the cord or cable 34 is pulled the pads 25 will be rotated 180° in one direction and when the other cord 35 is pulled in the other direction the pads will be rotated in the opposite direction for a distance of 180°. The cords 34 and 35 preferably extend through the air channel formed by the side casing or housing 36 into the car and each may be provided with a small weight to keep it taut when the door is being opened or closed.

The combination visor and air cooler of Figs. 7 and 8 may be made in three sections, a top surface section or plate 37, a bottom surface section or plate 38 riveted or welded at 39 to section 37, and the intermediate section or partition 29 riveted or welded at 40 to section 38 and at 41 to section 37. At the front edge a screen 42 is secured to both the top and bottom sections. The central partition 29 is provided with a series of semi-circular openings 43 provided, as seen in Fig. 8, above the central lateral width of the visor.

The air flows in the directions indicated by the arrows in Figs. 7 and 8, that is upon forward movement of the car, it enters through the screen 42 up through the channel space 44 formed by the plates 37 and 29 and through the various openings 43 and from there through the filter discs or pads 25. From the pads the air flows through the channel 45 to and through the left end portion 46 into the side casing and finally through the door of the car above the window pane into the inside of the car. Water is maintained in the lower part of the channel 45 at a level approximately indicated at 47 in Fig. 7.

The operation of the modification is believed to be obvious from the foregoing description whereby when one of the cables 34 and 35 is pulled all of the discs 25 will be revolved 180°, thereby bringing the portions of the discs saturated with the water into the path of the air streams to be cooled and humidified by evaporation. At periodic periods the occupant of the car can pull one or the other of the cords and thus constantly water soaked pads will be in the path of the air streams.

The partition plate 29 may be in a plane adjacent or opposite each pad 25 and may be bent on the lines 49 to provide a slight bend to conform to the general curvature of the visor. A suitable filling opening and plug, not shown, may be provided through which water may be filled into the reservoir and this is periodically replenished as the water is evaporated.

The combination visor and air conditioner may be secured to the vehicle in any suitable manner such as by welding for permanent installation or by bolts and the like. In winter time when the air conditioner is not needed it is merely necessary to remove the housing 18, Fig. 1, and housing 36, Fig. 8, from the respective window and door frame, and thus the device merely acts as a visor so that when desired the structure can act as a visor alone or as a visor and air conditioner.

As an air conditioner the device operates during the travel of the vehicle to cool and humidify the air and by mere periodic replenishment of the water into the reservoir the device will operate without any further attention. The evaporative effect of the moisture and water in the pads through which the air stream passes cools the air so that in the inside of the vehicle it will be many degrees cooler than the outside temperature and in a condition making travel more bearable in hot weather. The air will also be cleaner since the air traveling through the wet material tends to act as an air filter.

It is of course obvious that the invention is not limited to all the features of the combination but the various parts may be used singly as well as in combination within the limits of the appended claims. Also the invention is applicable to any type of mobile vehicle including trucks, aircraft, boats, automobiles and the like.

If desired adjustable louvers may be provided for instance in the outlet end of the air tunnel on the door of the vehicle, and the louvers may be adjusted to force the cool air in the desired direction inside the car. It is also obvious that the louvers may be completely enclosed.

I claim as my invention:

1. A combination air conditioner and visor for mobile vehicles comprising an elongated casing in the shape of a visor for a windshield of a vehicle and having a hollow space therein, a second casing adapted to be secured to a door frame of the vehicle at a window opening of the door frame and cooperating with the first-mentioned casing as a continuation of the hollow space therein forming in both casings an air channel for the flow of air when the vehicle is in motion, said first-mentioned casing having an opening along the front leading edge thereof for the entry of air when the vehicle is in motion and the other casing having an opening directed into the interior of the vehicle at the window opening of the door frame, and means in the first-mentioned casing to condition the air as it flows from the front edge opening through the air channel to the second-mentioned casing.

2. A combination air conditioner and visor for mobile vehicles comprising a hollow visor casing secured to the vehicle just above a windshield of the vehicle and having an air channel therein extending from a front leading edge opening to a rear side opening, a second casing adapted to be secured on a door of the vehicle at a window opening therein and having an air channel communicating with the rear side opening of the first-mentioned casing and the interior of the vehicle for the flow of air when the vehicle is in motion, and means in the first-mentioned casing to condition the air as it flows through its air channel and then into the second-mentioned casing.

3. A combination air conditioner and visor for mobile vehicles comprising a hollow visor casing secured to the vehicle just above a windshield of the vehicle and having an air channel therein extending from the front leading edge opening to a rear side opening, a second casing adapted to be secured on a door of the vehicle at a window opening therein and having an air channel communicating with the rear side opening of the first-mentioned casing and the interior of the vehicle for the flow of air when the vehicle is in motion, and means in the first-mentioned casing to condition the air as it flows through its air channel and then into the second-mentioned casing, said first-mentioned casing including a water reservoir and a pad to be moistened by the water in the path of the air.

4. A combination air conditioner and visor for mobile vehicles comprising a hollow visor casing secured to the vehicle just above a windshield of the vehicle and having an air channel therein extending from a front leading edge opening to a rear side opening, a water reservoir in the upper part of the casing, a trough in the approximate mid-portion of the casing and under the reservoir, and a wick sheet extending from the trough to the front edge opening of the first-mentioned casing to thus condition the air as it flows through the wick sheet.

5. A combination air conditioner and visor for mobile vehicles comprising a hollow visor casing secured to the vehicle just above a windshield of the vehicle and having an air channel therein extending from a front leading edge opening to a rear side opening, a water reservoir in the upper part of the first-mentioned casing and having an outlet tube depending from the bottom of the reservoir, a trough in the approximate mid-portion of the casing and under the reservoir and having a cup-shaped depression therein under the end of the outlet tube, and a wick sheet extending from the trough to the front edge opening of the casing which is moistened by water from the reservoir to thus condition the air as it flows through the wick sheet.

6. A combination air conditioner and visor for mobile vehicles comprising a hollow visor casing secured to the vehicle just above a windshield of the vehicle and having an air channel therein extending from a front leading edge opening to a rear side opening, a water reservoir in the upper part of the casing and having an outlet tube depending from the bottom of the reservoir, a trough in the approximate mid-portion of the casing and under the reservoir and having a cup-shaped depression therein under the end of the outlet tube, a wick sheet extending from the trough to the front edge opening of the first-mentioned casing which is moistened by water from the reservoir to thus condition the air as it flows through the wick sheet, and means in the reservoir to fill the latter with water.

7. A combination air conditioner and visor for mobile vehicles comprising a hollow visor casing secured to the vehicle just above a windshield of the vehicle and having an air channel therein extending from a front leading edge opening to a rear side opening, a second casing adapted to be secured to a window opening of a door of the vehicle and having an air channel communicating with the rear side opening of the first-mentioned casing and the interior of the vehicle for the flow of air when the vehicle is in motion, a central partition extending the entire width and length of the first-mentioned casing and having openings therein, and a plurality of pads mounted to rotate in the first-mentioned casing and adapted to take up water to condition the air as it flows through the first-mentioned casing.

8. A combination air conditioner and visor for mobile vehicles comprising a hollow visor casing secured to the vehicle just above a windshield of the vehicle and having an air channel therein extending from a front leading edge opening to a rear side opening, a second casing adapted to be secured to a window opening of a door of the vehicle and having an air channel communicating with the rear side opening of the first-mentioned casing and the interior of the vehicle for the flow of air when the vehicle is in motion, a central partition extending the entire width and length of the first-mentioned casing and having a plurality of semi-circular openings therein, the front side of the partition forming an air channel with its casing, and the rear side forming with the casing a water reservoir in the lower part and an air channel in the upper part, and a plurality of pads rotatably mounted in the rear side portion of the first-mentioned casing and one for each semi-circular opening and extending into the reservoir, said pads being adapted to take up water to condition the air passing through the first-mentioned casing.

9. A combination air conditioner and visor for mobile vehicles comprising a hollow visor casing secured to the vehicle just above a windshield of the vehicle and having an air channel therein extending from a front edge opening to a rear opening, a central partition extending the entire width and length of the casing and having a plurality of semi-circular openings therein, the front side of the partition forming an air channel with its casing and the rear side forming with the casing a water reservoir in the lower part and an air channel in the upper part, a plurality of pads rotatably mounted in the rear side portion of the casing and one for each semi-circular opening and extending into the reservoir, said pads being adapted to take up water to condition the air passing through the casing, and means to rotate the pads simultaneously to expose the portions which were in the water to the air stream.

10. A combination air conditioner and visor for mobile vehicles comprising a hollow visor casing secured to the vehicle just above a windshield of the vehicle and having an air channel therein extending from a front edge opening to a rear opening, a central partition extending the entire width and length of the casing and having a plurality of semi-circular openings therein, the front side of the partition forming an air channel with its casing and the rear side forming with the casing a water reservoir in the lower part and an air channel in the upper part, a plurality of pads rotatably mounted in the rear side portion of the casing and one for each semi-circular opening and extending into the reservoir, said pads being adapted to take up water to condition the air passing through the casing, and a pulley for each pad and a cable interconnecting the pulleys and extending into the interior of the vehicle to simultaneously rotate the pads to expose the portions which were in the water to the air stream.

11. A combination air conditioner and visor for mobile vehicles comprising a hollow visor casing secured to the vehicle just above a windshield of the vehicle and having an air channel therein extending from a front edge opening to a rear opening, a central partition extending the entire width and length of the casing and having a plurality of semi-circular openings therein, the front side of the partition forming an air channel with its casing and the rear side forming with the casing a water reservoir in the lower part and an air channel in the upper part, a plurality of pads rotatably mounted in the rear side portion of the casing and one for each semi-circular opening and extending into the reservoir, said pads being adapted to take up water to condition the air passing through the casing, a pulley for each pad and a cable interconnecting the pulleys and extending into the interior of the vehicle to simultaneously rotate the pads to expose the portions which were in the water to the air stream, and a screen over the front edge opening of the casing.

EDWIN E. FOSTER.

REFERENCES CITED

The following references are of record in the file of this patent:

UNITED STATES PATENTS

| Number | Name | Date |
|---|---|---|
| 1,635,609 | Crawford | July 12, 1927 |
| 2,257,639 | Moore | Sept. 30, 1941 |
| 2,435,798 | Rice et al. | Feb. 10, 1948 |
| 2,495,538 | Mousel | Jan. 24, 1950 |

FOREIGN PATENTS

| Number | Country | Date |
|---|---|---|
| 330,878 | Great Britain | June 11, 1930 |